Oct. 23, 1934.  A. C. McCORD  1,978,160
WRINGER DRIVE
Filed Oct. 5, 1931   3 Sheets-Sheet 1

INVENTOR.
Alvin C. McCord
BY
ATTORNEYS

Oct. 23, 1934.  A. C. McCORD  1,978,160
WRINGER DRIVE
Filed Oct. 5, 1931  3 Sheets-Sheet 2
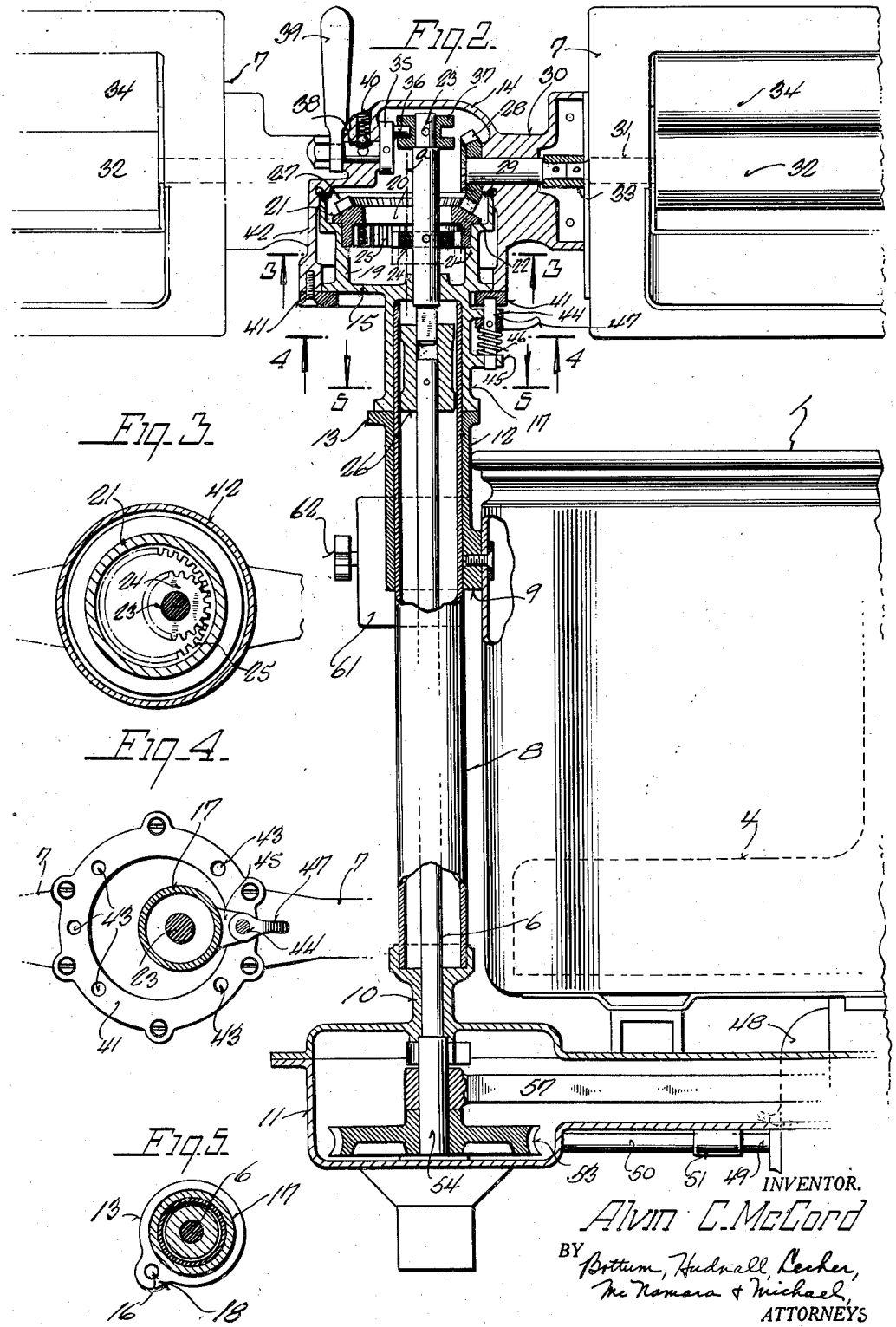
INVENTOR.
Alvin C. McCord
BY Bottum, Hudnall, Lesher,
McNamara & Michael,
ATTORNEYS Oct. 23, 1934.　　　A. C. McCORD　　　1,978,160
WRINGER DRIVE
Filed Oct. 5, 1931　　　3 Sheets-Sheet 3

INVENTOR.
Alvin C. McCord
BY Bottum, Hudnall, Becher,
McNamara & Michael,
ATTORNEYS Patented Oct. 23, 1934

1,978,160

UNITED STATES PATENT OFFICE 1,978,160

WRINGER DRIVE

Alvin C. McCord, Chicago, Ill., assignor, by mesne assignments, to McCord Radiator & Mfg. Co., Detroit, Mich., a corporation of Maine Application October 5, 1931, Serial No. 566,996

2 Claims. (Cl. 74—420)

This invention relates to washing machines and more particularly to the mounting and the drive for the wringer mechanism thereof.

One object of my invention is to provide an arrangement whereby the application of power to the wringer rolls for rotating them is from an axis different from that about which the wringer mechanism is swingable for adjustment into its various positions of use.

Another object of my invention is to make the casing or housing for those parts of the drive at the wringer in upper and lower sections, with one section stationary and the other movable about the axis of adjustment for the wringer, so that the latter in being fixed to the movable section, may be adjusted or swung therewith about the said axis.

Another object of my invention is to hold the wringer mechanism in its various positions of adjustment by a latch means mounted on and carried by the stationary section of the casing and co-operable with the movable section.

A further object of my invention is to have the casing or housing referred to detachable from the main support of the machine so that the wringer mechanism and its latch means may be removed from and applied to the machine as a unit.

A further object of my invention is to employ a ring gear in the drive for the wringer mechanism and swing or adjust the latter about the axis of said gear, thereby permitting power to be applied to said gear from a different axis.

A further object of my invention is to employ a reversible electric motor as a power unit for the machine, whereby the wringer rolls may be operated in reverse by merely reversing the direction of rotation of the motor through a suitable control switch.

A further object of my invention is to provide a form of clutch means in the drive of the machine whereby the wringer mechanism may be easily and readily clutched to and de-clutched from the drive without the necessity of forcibly moving any gears or other parts into and out of mesh as heretofore required which when under a heavy load or torque renders de-clutching impossible.

A further object of my invention is to employ a multiple-disc clutch as one form of clutch means, thereby permitting all of the gears of the drive to remain constantly in mesh and avoid the necessity for their separation when de-clutching the wringer from the drive.

Other and further objects of my invention will appear from the following specification taken in connection with the accompanying drawings, in which—

Fig. 2 is a vertical sectional view, with parts in elevation, taken on line 2—2 of Fig. 1;

Figure 1:
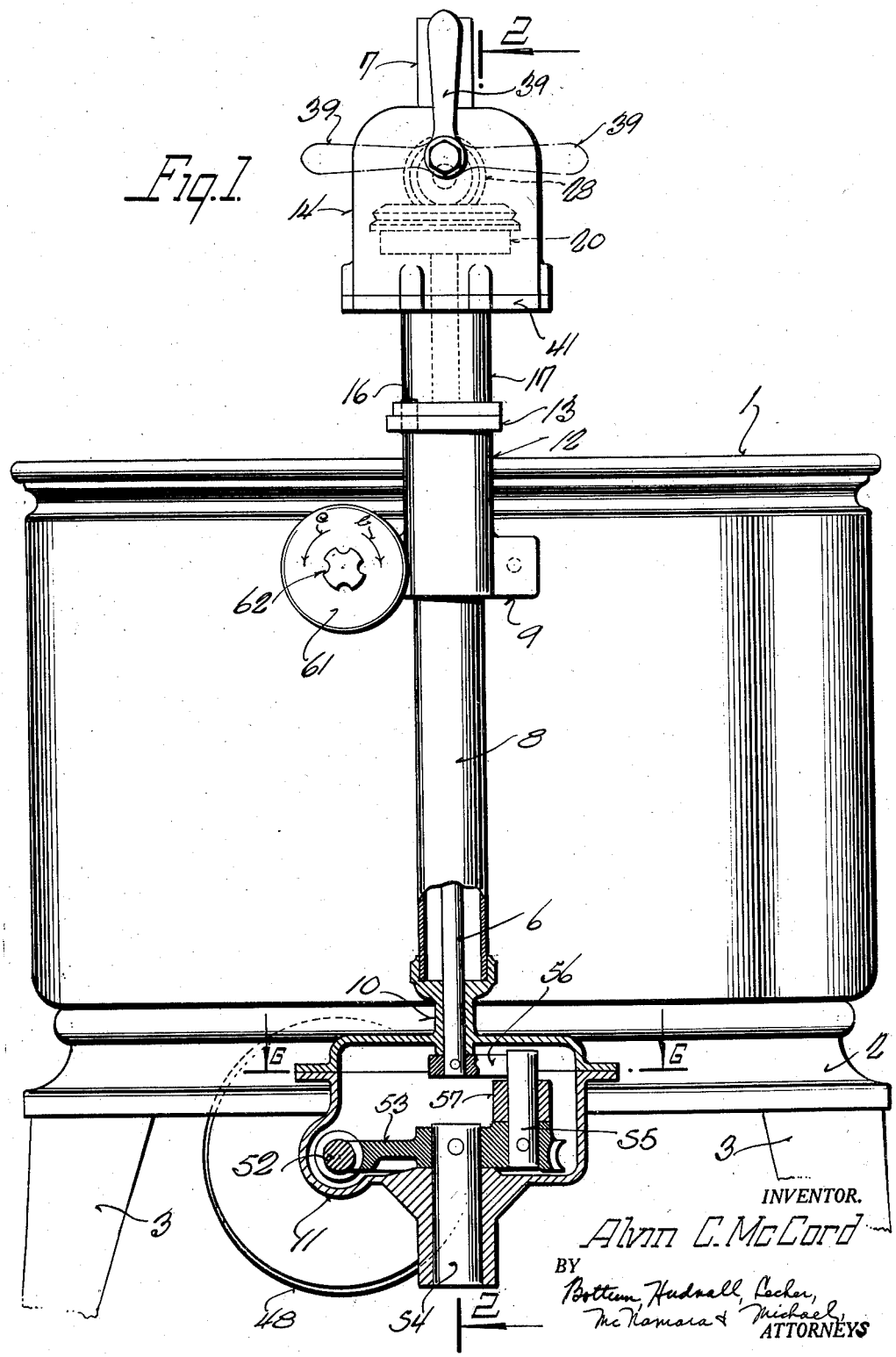
Fig. 1 is a side view, with parts in section, of a washing machine equipped with a wringer mounting and drive in accordance with my invention.
Figure 6:
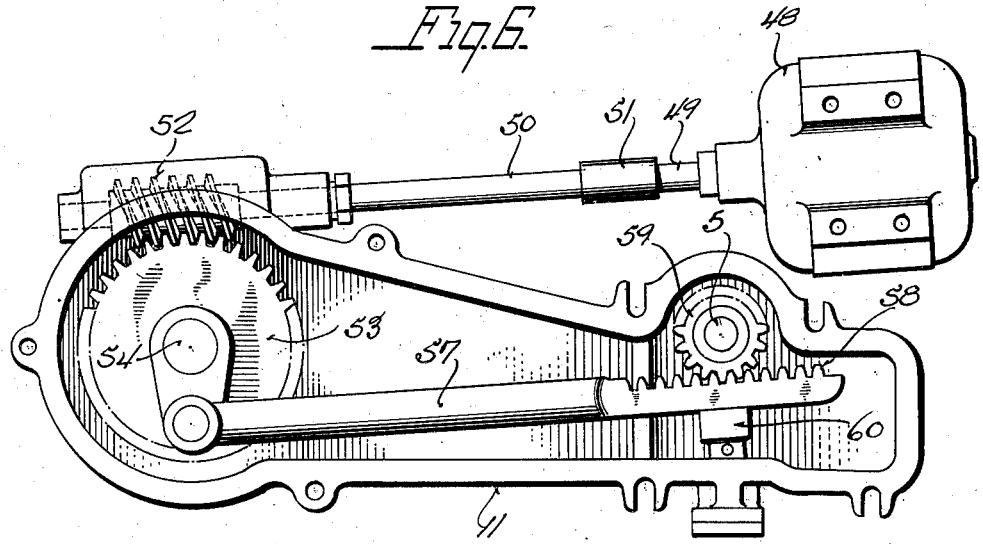
Figure 7:
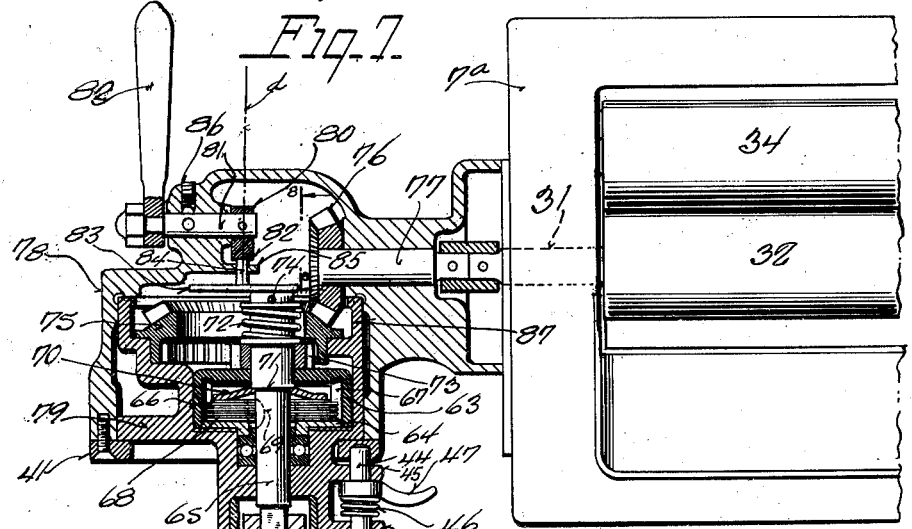
Figure 8:
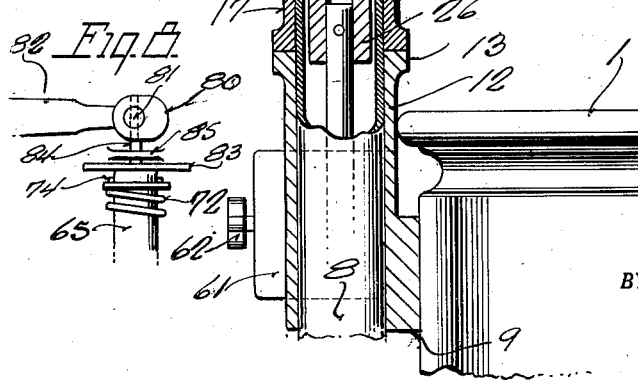

Figs. 3, 4 and 5 are horizontal sectional views taken on lines 3—3, 4—4 and 5—5, respectively, of Fig. 2;

Fig. 6 is a horizontal plan view taken on line 6—6 of Fig. 1 to show the drive for the wringer mechanism and the agitator of the machine;

Fig. 7 is a vertical sectional view showing a multiple-disc clutch in the wringer drive; and Fig. 8 is a view taken on line 8—8 of Fig. 7 showing the action of the cam to control the operation of the clutch.

In the drawings, 1 indicates the tub of the machine arranged on a support 2 having legs 3. The tub is of the upwardly opening type and is provided with a removal lid or cover not shown. Arranged within the tub is an agitator 4 adapted to be oscillated about a vertical axis as provided by an upright spindle 5 (Fig. 6) extending centrally into the tub through its bottom wall. The agitator is mounted on and connected with the upper end of the spindle as in machines of this general character.

Arranged exterior of the tub 1 at one side thereof is an upright driving shaft 6 for the wringer mechanism 7, the latter being located above the tub and mounted for swinging movement with respect thereto in accordance with my invention. Shaft 6 is located in a tubular housing 8 secured to the side of the tub by a bracket 9. The lower end of housing 8 joins with a tubular extension 10 provided on the upper side of a casing 11 which houses the drive for the shaft 6 and the spindle 5. The lower end of shaft 6 is journaled in the extension 10 as shown in Fig. 1.

Bracket 9 has an upwardly extending tubular portion 12 provided at its upper end above the tub 1 with an outwardly extending flange 13 forming a seat for the unit through which the wringer mechanism is connected to and operated from shaft 6. This unit comprises an outside casing formed of upper and lower relatively rotatable sections 14, 15, the lower section 15 being fixed against rotation by a pin 16 to be presently described. Lower section 15 has a depending tubular portion 17 fitting over the upper end of housing 8 and seating on the upper end of bracket 9 at flange 13, as shown in Fig. 2. Pin 16 is carried by lower section 15 in a lug 18 (Fig. 5) at one side of tubular portion 17 and fits in a hole or recess in a similar lug on flange 13. By this arrangement, the unit making up sections 14 and 15 may be removed intact with the wringer mechanism 7 from the support as provided by the bracket 9 on merely lifting the parts to free the pin from the bracket.

Lower section 15 has an upwardly extending annular wall 19, the upper end of which provides a rotative seat for upper section 14. The latter is turnable about the axis of a ring gear 20 rotatably supported in lower section 15 on seats or shoulders 21, 22 provided therein, as shown in Fig. 2. A shaft 23 extends through said gear in offset or eccentric relation to the axis thereof (indicated by dotted line $a$) and is provided with a gear pinion 24 meshable with the internal teeth 25 of said ring gear. Shaft 23 is in alinement with shaft 6 and is connected therewith by a coupling 26. The latter may be in the form of a sleeve fixed to shaft 6 and having a non-rotative, but slip connection with shaft 23 to permit disconnection of the shafts when lifting shaft 23 with the unit referred to. Ring gear 20 is provided on its upper side with bevel teeth 27 in mesh with a bevel gear 28 arranged normal to the ring gear and fixed to a shaft 29 journaled in a lug or web 30 at one side of upper section 14. Wringer mechanism 7 is attached to this web and has the shaft 31 of its lower roll 32 connected with shaft 29 by a coupling sleeve 33 in the same manner as described for sleeve 26. The upper roll 34 of the wringer is pressed against the lower roll to be rotated thereby through the medium of the spring tension with which the wringer is provided, as usual in these devices.

To disconnect the wringer rolls from the drive of shaft 6, shaft 23 is moved endwise to carry gear pinion 24 out of mesh with the teeth 25 of ring gear 20. This is accomplished by having the upper end of shaft 23 connected with a crank arm 35 through a pin 36 and a grooved collar 37. The pin is fixed to the arm, and the collar to the shaft, as shown in Fig. 2. Arm 35 is fixed to a rock shaft 38 journaled in section 14 with a handle 39 on the outer end of said shaft. A ball check or detent 40 is employed to hold the shaft and handle against accidental movement out of neutral and gear engaged positions. The latter position is shown in Fig. 2. The other positions are on opposite sides of the first one, shaft 38 having notches or recesses for such positions. In the arrangement shown, the shaft 23 is raised to connect the wringer rolls with the drive of shaft 6, while lowered to release the drive. With the use of a ring gear in the drive, the wringer mechanism may be adjusted about the axis of the ring gear, the latter enabling the shaft 23 to extend therethrough and apply power to the same from a different axis.

To hold the wringer mechanism 7 in any of its adjusted positions about the axis of the ring gear, either when over or exterior of the tub, I provide a latch mechanism comprising a ring member 41 secured to the rotatable section 14, preferably at the lower end thereof of its surrounding wall 42 and extending inward beneath section 15 to hold the sections together. Ring member 41 has recesses or holes 43 in its underside to receive the upper end of a vertically disposed bolt 44, slidably mounted below the ring member in lugs or ears 45, 45 on the depending portion 17 of section 15, as shown in Fig. 2. A coiled spring 46 normally urges the bolt upwardly so as to snap into a recess 43 when brought opposite the bolt in the turning of the section 14. The spring encircles the bolt between lower ear 45 and a handle member 47 fixed to the bolt and extending outward therefrom and by which the bolt is depressed to be released from the ring member. As shown in Fig. 4, two groups of recesses 43 are provided in the ring member 41, on opposite sides of the section 14. This arrangement of the recesses is sufficient because the wringer mechanism in use only requires a few positions of adjustment when over and exterior of the tub. With the bolt 44 and cooperating ring member 41 carried by the casing sections 14 and 15, respectively, the latch mechanism becomes a part of the unit making up the casing for the gear drive and is carried therewith on being applied to and removed from the machine.

Power is supplied to the machine from a reversible electric motor 48 located beneath the tub 1 on the base or support 2. The motor is mounted with its armature shaft 49 horizontal or relatively so as shown in Figs. 1 and 6. Shaft 49 is connected to a similarly disposed shaft 50 by a coupling 51. Shaft 50 has a worm 52 meshing with a worm gear 53 fixed to an upright shaft 54 journaled in the bottom wall of the housing 11 in line with shaft 6 as shown in Figs. 1 and 2. Gear 53 has a crank pin 55 connected with a crank arm 56 fixed to the lower end of shaft 6 in housing 11. For actuating spindle 5 from gear 53, a rod 57 is pivoted at one end to pin 55 and has rack teeth 58 adjacent its other end meshing with a pinion 59 fixed to the lower end of spindle 5 as shown in Fig. 6. A spring pressed plunger 60 is mounted in housing 11 to guide and hold rod 57 in mesh with pinion 59.

The control switch for the motor 48 is indicated at 61 in Figs. 1 and 2. This switch is of the desired six pole type to start, stop and reverse the motor 48. To reverse the motor, the current in the starting winding must be reversed in relation to the running winding. This can be accomplished with a four pole switch, but the two additional poles are necessary to start and stop the motor. Inasmuch as the switch mechanism can be procured on the market, I need not further describe it, except to say that it is mounted on the machine at any convenient accessible point, preferably at the bracket 9 and has its turn button 62 within reach of the operator for actuating the switch in the operation of the machine. When the switch is turned in one direction, as toward the right as indicated by the arrow $b$ in Fig. 1, the motor 48 is rotated in a direction to turn the wringer rolls in a direction for wringing out of the tub 1. When the switch is turned in the opposite direction as indicated by the arrow $c$, the motor 48 is reversed for turning the wringer rolls in a direction for wringing into the tub 1. By the use of a reversible motor, no reversing mechanism is required in the drive for the wringer rolls, thus simplifying the construction of the drive, as well as the mounting for the wringer.

In Fig. 7 I have shown an arrangement embodying a friction clutch in the drive to the wringer rolls, thereby avoiding the separation of any gears when de-clutching the wringer mechanism from the drive of the machine. As illustrated, the clutch is of the multiple disc type, located in a housing having an upper section 63 in inverted cup form and a lower section 64 in plate form and constituting a closure for the lower end of the housing. A shaft 65, similar to shaft 23, extends centrally through the clutch housing and also through a series of flat clutch discs therein. The discs are arranged in two sets, those 66 of one set being keyed or fixed to the housing by keys in form of ribs 67 therein, and terminating short of the shaft 65 as shown. The discs 68 of the other set are keyed to the shaft 65 by a key 69, but have no connection with the housing. The discs of the two sets alternate, as shown in Fig. 7.

Located in the clutch housing above the pile of discs is a spring 70 in annular form and surrounding the shaft 65 below a shoulder 71 thereon. This spring normally tends to press the discs together, the pile of discs resting on the bottom plate 64. Shaft 65 is normally urged upward by a coil spring 72 to release the pressure on the discs when de-clutching therethrough. Spring 72 surrounds shaft 65 between a gear pinion 73 and pin 74 thereon. Pinion 73 is in constant mesh with the internal teeth of a ring gear 75 through which the shaft extends in eccentric relation to the axis thereof as before. The bevel teeth of the ring gear mesh with a bevel gear 76 on a shaft 77 through which power is transmitted to the wringer mechanism 7a as before.

The clutch and gearing just described are located in a housing having upper and lower sections 78, 79, the former being rotatably mounted on the latter and carrying the wringer mechanism 7a so that it may be adjusted or swung about the axis of the ring gear 75, the same as before.

Shaft 65 is depressed to engage the clutch through a cam member 80 located in the housing section 78 above the shaft. Cam member 80 is fixed to a rock shaft 81 journaled in housing section 78 and extending outward therefrom to receive an operating handle 82 as shown in Fig. 7. The cam member 80 is disposed in line with the axis of the ring gear 75, as indicated by the dot and dash line d in Fig. 7. This positions the cam member in offset relation to the shaft 65 and in order that the cam member may operate on the shaft for depressing it in all positions of the wringer 7a, I provide a circular plate or disk 83 located between the cam member and the shaft. The disk is horizontally disposed and has a central upstanding boss 84 in line with the axis of the ring gear and extending through a bracket 85 fixed to the upper housing section 78 directly beneath the cam member as shown. The cam member 80 operates against the upper end of the boss 84, the latter being held against the cam member by the action of the coil spring 72 in pressing the shaft 65 upwardly against the plate 83. With the plate circular, it is apparent that the plate always retains engagement with the shaft 65 regardless of the position of the wringer 7a and thus the cam member is always available for depressing the shaft in any position of the wringer.

When the handle 82 is moved to its horizontal position to either side of its vertical position as shown in Fig. 8, the cam member 80 has been turned to permit raising of the shaft 65 by the spring 72 and the wringer rolls are released from the drive of the machine. A ball check 86 is employed to retain the handle 82 in either of its before mentioned positions. The rock shaft 81 has recesses to receive the ball check. The lower section 79 of the gear housing has an upstanding wall 87 upon the upper edge of which turns the upper section 78, as shown in Fig. 7.

With very little endwise movement required of shaft 65 to clutch or de-clutch the parts, the gear pinion 73 remains constantly in mesh with the ring gear 75, and separation of the gears is unnecessary. The advantage of this is that whatever load may be on the gears when de-clutching does not interfere with or hinder the de-clutching action. Thus the torque in the gears, even when the greatest, as when a heavy blanket or similar piece is passed through the wringer rolls does not prevent the de-clutching of the wringer as usually occurs when two gears must be separated, as in machines as heretofore designed. With the multiple disc clutch, in particular, no difficulty is experienced in de-clutching at any time and the structure shown and described is novel and effective.

In both forms of gearing shown in Figs. 2 and 7, it will be noted that the drive for the wringer rolls includes a pair of cooperating revolving members and a third revolving member associated with one of the first mentioned members, and through which power is applied to operate the wringer rolls.

The details of construction and arrangement of parts shown and described may be variously changed and modified without departing from the spirit and scope of my invention except as pointed out in the appended claims.

I claim as my invention:

1. A drive for a washing machine roll wringer, comprising a rotatably mounted ring gear, a driving shaft extending through said ring gear and slidably mounted with respect thereto, a driven shaft in angular relation to the driving shaft, gearing connecting the ring gear to the driven shaft, a gear pinion in mesh with the ring gear for rotating the same from the driving shaft, a clutch device connecting the pinion to the driving shaft whereby the latter may be disconnected from said gear without demeshing the pinion therefrom, said clutch device being operated through endwise movement given to said driving shaft, and means for moving said shaft to clutch and declutch the clutch device.

2. A drive for a washing machine roll wringer, comprising angularly disposed driving and driven shafts, a rotatable ring gear surrounding the driving shaft and in eccentric relation thereto, gearing connecting the ring gear to the driven shaft, gearing including a clutch connecting the ring gear to the driving shaft, the latter being slidably mounted for opening and closing said clutch, and means for sliding the shaft to open the clutch, said means including a manually operable cam element disposed in line with the axis of the ring gear and a plate member transverse to said axis and providing an operative connection between the cam and the driving shaft.

ALVIN C. McCORD.